United States Patent [19]

Nakano et al.

[11] Patent Number: 4,907,285

[45] Date of Patent: Mar. 6, 1990

[54] IMAGE UNDERSTANDING SYSTEM

[75] Inventors: Yasuaki Nakano, Hino; Hiromichi Fujisawa, Tokorozawa; Junichi Higashino, Kokubunji; Masakazu Ejiri, Tokorozawa, all of Japan

[73] Assignee: Hitachi, Ltd., Tokyo, Japan

[21] Appl. No.: 253,445

[22] Filed: Oct. 5, 1988

Related U.S. Application Data

[63] Continuation of Ser. No. 133,070, Dec. 15, 1987, abandoned, which is a continuation of Ser. No. 768,463, Aug. 22, 1985, abandoned.

[30] Foreign Application Priority Data

Aug. 24, 1984 [JP] Japan ................................ 59-174924
Jun. 7, 1985 [JP] Japan ................................ 60-122425

[51] Int. Cl.$^4$ ............................................ G06K 9/20
[52] U.S. Cl. ....................................... 382/48; 382/57; 382/61; 358/453
[58] Field of Search ................... 382/9, 10, 22, 25, 26, 382/30, 33, 40, 48, 57, 61; 364/513, 275.9, 237.82, 927.73, 917.91, 523; 358/282, 287, 453; 235/436, 456

[56] References Cited

U.S. PATENT DOCUMENTS 4,516,265 5/1985 Kizu et al. ........................ 382/48

OTHER PUBLICATIONS

Giloi, et al., "A Grammar Approach for the Detection of Patterns . . . ", *AICA Conf. on Hybrid Comp.*, Aug. 27-31, 1973, Conf. 7, pp. 280-284.
Shaw A. C., "Parsing of Graph-Representable Pictures", *Journal of the Assoc. for Comp-Mach.*, vol. 17, No. 3, 7/70, pp. 453-481.
Uhr, L., "Flexible Linguistic Pattern Recognition", *Pattern Recognition*, vol. 3, 1971, pp. 363-383, Permagan Press, N.Y.

*Primary Examiner*—Leo H. Boudreau
*Assistant Examiner*—Jose L. Couso
*Attorney, Agent, or Firm*—Antonelli, Terry & Wands

[57] ABSTRACT

An image understanding system of this invention uses a grammar describing a document image, and represents the structure of an unknown input image by parsing a statement (the structure of the grammar) written in accordance with this grammer. In other words, the grammer describes an image as substructures and the relative relation between them, and when the substructures and their relative relation are identified in parsing, search is then made whether or not the substructures and their relative relation exist in an unknown input image. The structure of the unknown input image is represented on the basis of the result of this search.

12 Claims, 15 Drawing Sheets

FIG. 8
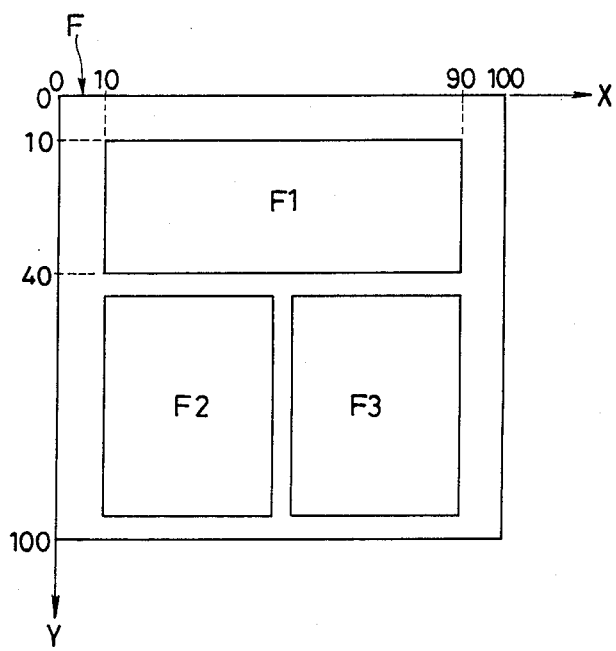
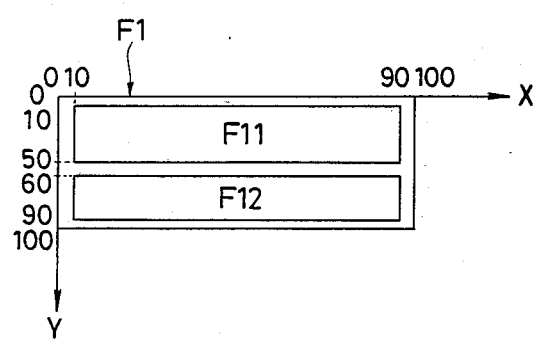

FIG. 9
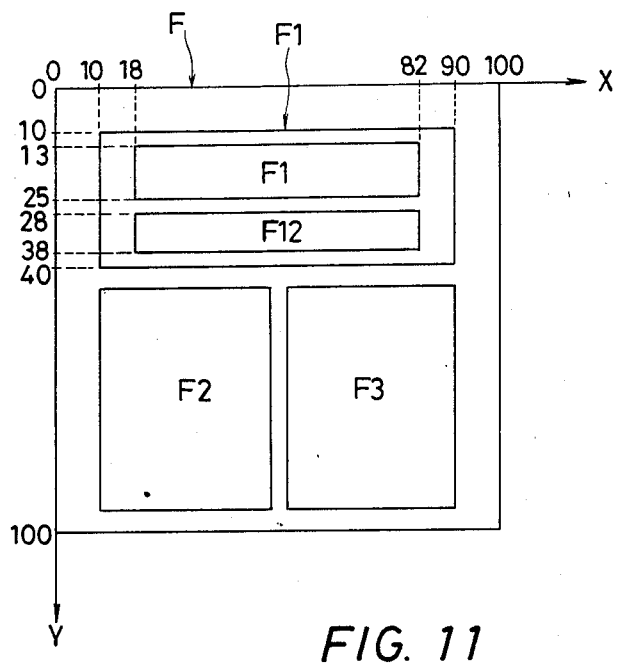
FIG. 11
(A) 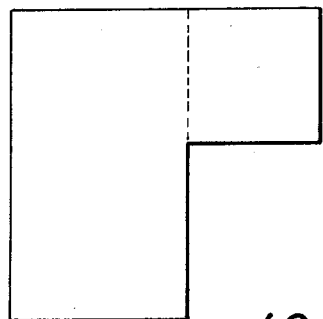   (B) 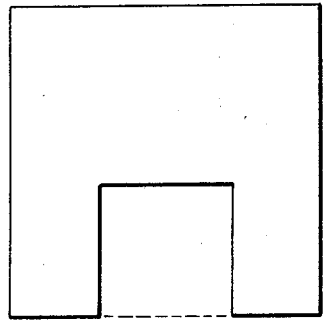
(C) 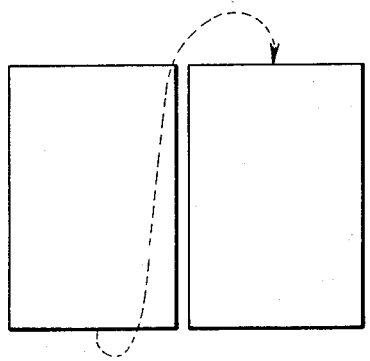

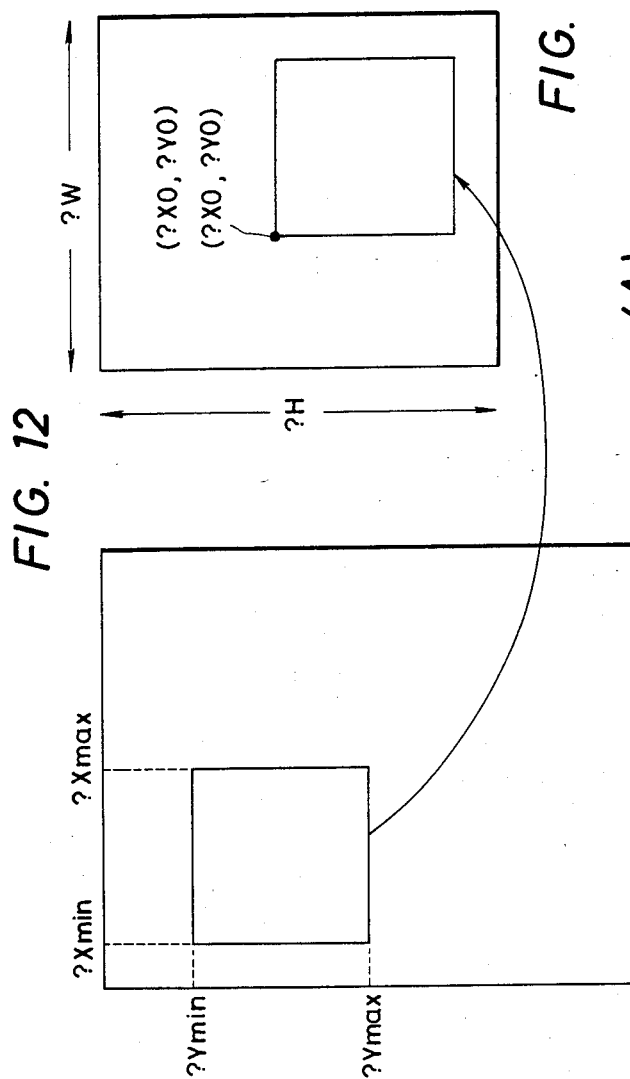
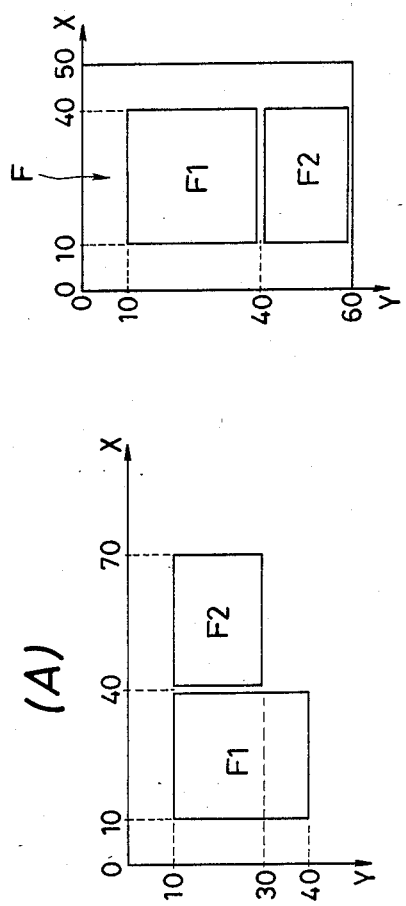
FIG. 12
FIG. 13

FIG. 16
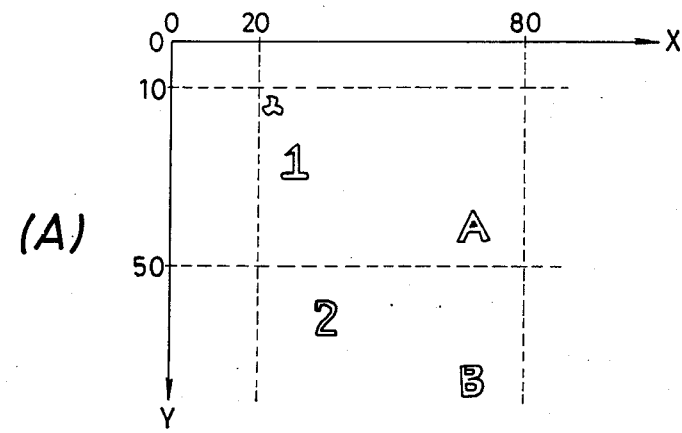
(A)
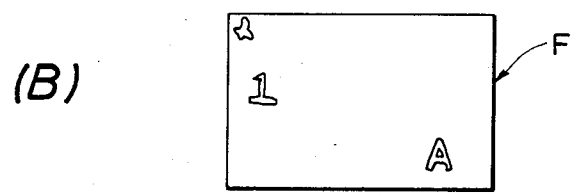
(B)
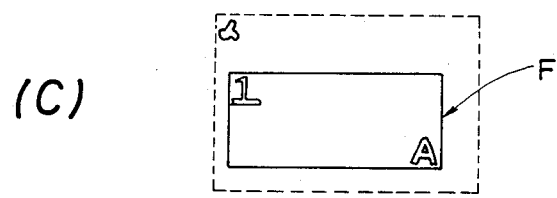
(C)

(A)

(B)

| i | Xmin(i) | Xmax(i) | Ymin(i) | Ymax(i) | | |
|---|---------|---------|---------|---------|---|---|
| 1 | 25 | 32 | 23 | 31 | O | 1 |
| 2 | 32 | 39 | 58 | 66 | X | 2 |
| 3 | 65 | 72 | 37 | 45 | O | A |
| 4 | 66 | 73 | 72 | 80 | X | B |
| 5 | 22 | 26 | 12 | 16 | X | △ |
| 6 | 68 | 69 | 40 | 42 | X | △ |
| 7 | 68 | 70 | 73 | 75 | X | □ |
| 8 | 68 | 70 | 77 | 79 | X | □ |

IMAGE UNDERSTANDING SYSTEM

This application is a continuation of U.S. patent application Ser. No. 133,070, filed Dec. 15, 1987, which is a Continuation application of U.S. patent application Ser. No. 768,463,

BACKGROUND OF THE INVENTION

This invention relates generally to a processing system for document data, and more particularly to a document image processing system suitable as an input unit to an electronic document image file.

Conventional electronic document files merely store each page of a document as an image, and secondary information for information retrieval must separately be given from outside using code input means (e.g., a keyboard). In order to automate a file input operation, however, it is preferred that secondary information is generated by automatically reading titles, author names and the like described in the documents. In order to further improve information retrieval, it becomes necessary to realize automatic input of the captions of tables and chapter captions, or automatic keyword extraction by recognition of the text itself. Segmentation of the image of the object document into portions such as captions, authors, abstract, text, figures, pictures, and the like, has also been required to reduce the memory space and to increase facets for retrieval.

A system which understands the content of a document and processes the document on the basis of the result of understanding to cope with the problems described above has so far been investigated, and an example of such a system is disclosed in "Basic Studies on System for Cuttings of Newspaper Articles" by Yoji Noguchi and Junichi Toyota (Resume 6C-1 of the 23rd National Convention of Information Processing Society of Japan; 1981). However, since this document understanding system is directed to the cuttings of newspapers, it is not clear whether or not the technique can be applied to documents having arbitrary formats. In addition, the portions of characters are merely segmented, but a method of combining segmentation with recognition is not disclosed.

SUMMARY OF THE INVENTION

The present invention is directed to provision of an image understanding system which deals with ordinary document images, segments them in accordance with their structures, and makes it possible to recognize the character portions, whenever necessary.

In order to accomplish the object described above, the present invention employs grammar describing the structure of a document image, and parses the statements (the structures of the document) expressed by the grammar to recognize the structure of an unknown input image. The grammar describes the image as substructures and the relative relation between them. In the parsing process, after the substructures and their relative relation are identified, a search is made as to whether or not the substructures and the relative relation exist in the unknown input image, and if they do, the inside of the substructures is further resolved to continue the analysis. If they do not, other possibilities are searched. The structure of the unknown input image is understood from the result of such a search.

BRIEF DESCRIPTION OF THE DRAWINGS

FIGS. 8, 9, 10, 11, 12 and 13 are explanatory views useful for explaining the principle of a fourth embodiment of the present invention;

FIGS. 16 and 17 are explanatory views useful for explaining the content of processing shown in FIG. 15.

DESCRIPTION OF THE PREFERRED EMBODIMENTS

First of all, a parsing method in the embodiments of the invention will be explained before the description of the embodiments. Though the following description will deal with a technical paper as an example of documents, the present invention can also be applied to other documents by changing some parts of the grammar because the grammar formats are somewhat different. Therefore, the present invention is not particularly limited to the example of the technical paper.

Figure 1:
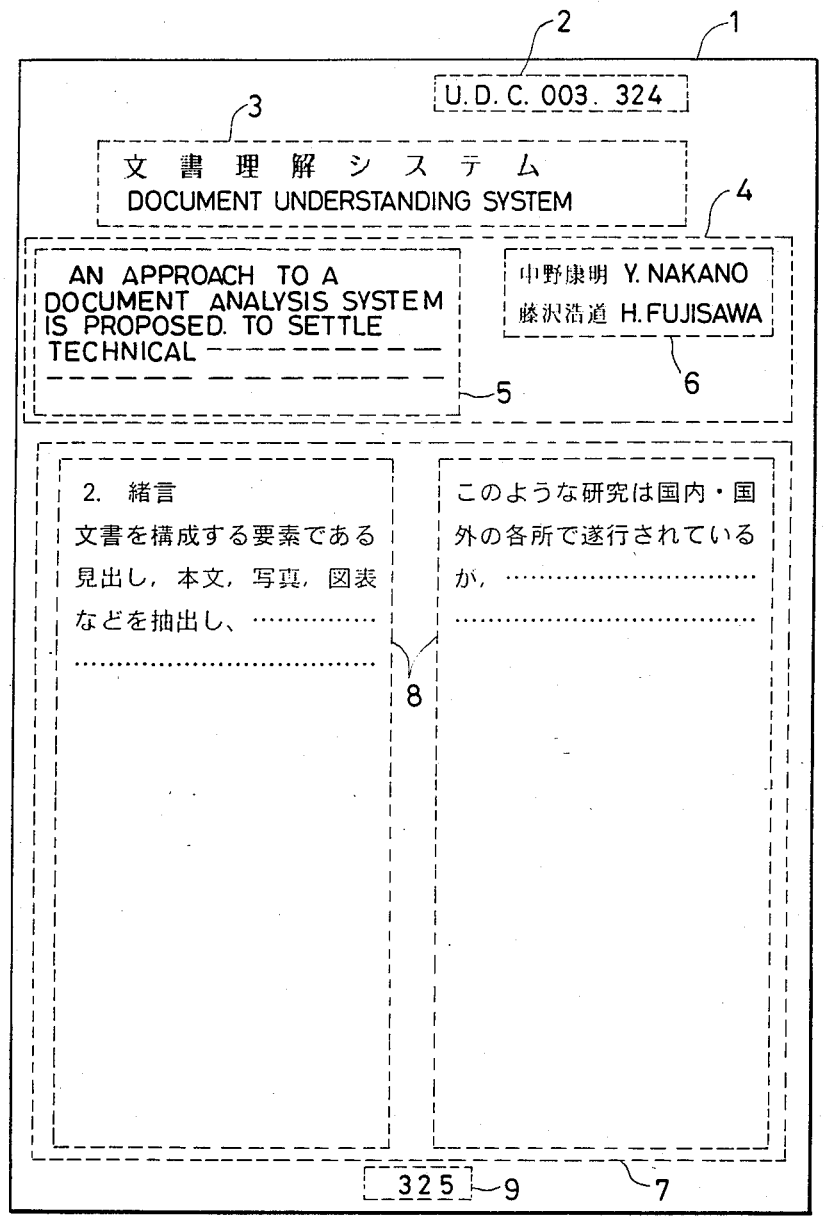
FIG. 1 shows an example of documents.

FIG. 1 shows an example of one page of a technical paper having a predetermined format. The following illustrates an example of the grammar (hereinafter referred to as "document grammar") expressing the structures of the documents.

| | (textline) | |
|---|---|---|
| 1 | <document> | ::= \| <technical>paper> \| <paperback novel> \| ~ \| <patent> |
| 2 | <technical paper> | ::= <title page> |
| 3 | <technical paper> | ::= <technical paper>[+ <continued page>:] |
| 4 | <title page> | ::= \| <UDC> η<title content> η<author abstract> η<text> η<title page separator> |
| 5 | <continued page> | ::= <heading> η<text> η<page separator> |
| 6 | <UDC> | ::= <<UDC>> ξ<period numeral>[ξ<<CL>>ξ<period numeral>] |
| 7 | <heading> | ::= <Japanese title>ξ<volume number>ξ<numeral> |
| 8 | <volume number> | ::= <<VOL>>ξ<numeral>ξ<<NO>>ξ <numeral> |
| 9 | <title content> | ::= <Japanese title>η <English title> |
| 10 | <Japanese title> | ::= <Japanese textline region> |
| 11 | <English title> | ::= <English textline region> |
| 12 | <author abstract> | ::= ξ<author group> |
| 13 | | ::= <English textline region> |
| 14 | <author group> | ::= <author> |
| 15 | <author group> | ::= <author group>[η<author>] |

-continued

| | (textline) | | |
|---|---|---|---|
| 16 | \<author\> | ::= | \<Japanese textline\>ξ\<English textline\> |
| 17 | \ | ::= | \<numeral\> |
| 18 | \<text\> | ::= | \<column\> ξ \<column\> |
| 19 | \<column\> | ::= | \<section\>[η\<column\>] |
| 20 | \<section\> | ::= | \<chapter caption\>η\<section caption\>η \<section text\> |
| 21 | \<section\> | ::= | \<section caption\>η\<section text\> |
| 22 | \<section\> | ::= | \<section text\> |
| 23 | \<section\> | ::= | \<\<reference\>\> η \<reference list\> |
| 24 | \<chapter caption\> | ::= | \<\<numeral\>\>ξ\<Japanese textline\> |
| 25 | \<section caption\> | ::= | \<period numeral\>ξ\<Japanese textline\> |
| 26 | \<section text\> | ::= | \<paragraph\> [ η\<section text\>] |
| 27 | \<paragraph\> | ::= | \<Japanese textline region\> |
| 28 | \<paragraph\> | ::= | \<figure table\> |
| 29 | \<Japanese textline region\> | ::= | \<Japanese textline\> η[\<Japanese textline region\>] |
| 30 | \<Japanese textline\> | ::= | \<\<Japanese character\>\>ξ[\<Japanese textline\>] |
| 31 | \<Japanese textline\> | ::= | \<\<Japanese character\>\> α[\<Japanese textline\>] |
| 32 | \<Japanese textline\> | ::= | \<\<Japanese character\>\> β[\<Japanese textline\>] |
| 33 | \<English textline region\> | ::= | \<English textline\> η[\<English textline region\>] |
| 34 | \<English textline\> | ::= | \<word\>ξ\<\<DLM\>\>ξ[\<English textline region\>] |
| 35 | \<word\> | ::= | \<\<alphabet\>\>[ξ\<word\>] |
| 36 | \<word\> | ::= | \<\<alphabet\>\>[α\<word\>] |
| 37 | \<word\> | ::= | \<\<alphabet\>\>[β\<word\>] |
| 38 | \<word\> | ::= | \|{English person name}\| {English organization name}\| {English location name}\| \|{general English word}\| |
| 39 | \<numeral\> | ::= | \<\<numeral\>\>[ξ \<numeral\>] |
| 40 | \<period numeral\> | ::= | \<numeral\> |
| 41 | \<period numeral\> | ::= | \<period numeral\>ξ\<numeral\> |
| 42 | \<period numeral\> | ::= | \<period numeral\>ξ\<\<PR\>\> |
| 43 | \<\<numeral\>\> | ::= | \|0\|1\|~\|9\| |
| 44 | \<\<alphabet\>\> | ::= | \|a\|b\|c\|d\|~\|A\|B\|~\|0\|1\|~\| |
| 45 | \<\<Japanese character\>\> | ::= | \| \| \|~\| \| \|~\| \| \|~\|a\|b\| ~\|A\|B\|~\|0\|1\|~1 |
| 46 | \<\<DLM\>\> | ::= | \| \|,\|.\|~\| |
| 46 | \<\<CL\>\> | ::= | \|:\| |
| 47 | \<\<PR\>\> | ::= | \|.\|,\|]\| |
| 48 | \<figure table\> | ::= | \|-figure-\|η \<Japanese explanation\> η \<English explanation\> |
| 49 | \<figure table\> | ::= | \<Japanese explanation\> η \<English explanation\>η \<table\> |
| 50 | \<figure table\> | ::= | \<box\> |
| 51 | \<box\> | ::= | \|-field-\|   \<section\> |
| 52 | \<Japanese explanation\> | ::= | \<\<word-figure\>\>ξ\<numeral\>ξ \<Japanese textline\> |
| 53 | \<Japanese explanation\> | ::= | \<\<word-table\>\>ξ \<numeral\>ξ \<Japanese textline\> |
| 54 | \<Japanese explanation\> | ::= | \<Japanese explanation\> η \<Japanese textline region\> |
| 55 | \<English explanation\> | ::= | \<\<FIG\>\> ξ\<numeral\> ξ \<English textline\> |
| 56 | \<English explanation\> | ::= | \<\<TAB\>\> ξ\<numeral\> ξ \<English textline\> |
| 57 | \<English explanation\> | ::= | \<English explanation\>η \<English textline region\> |
| 58 | \<\<FIG\>\> | ::= | \|FIG.\| |
| 59 | \<\<TAB\>\> | ::= | \|Table\| |
| 60 | \<\<word-figure\>\> | ::= | \|figure\| |
| 61 | \<word-table\> | ::= | \|table\| |
| 63 | \<\<VOL\>\> | ::= | \|VOL\| |
| 64 | \<\<NO\>\> | ::= | \|No.\| |
| 73 | \<\<UDC\>\> | ::= | \|U. D. C.\| |
| 66 | \<table\> | ::= | \<box\> γ\<table\>[δ \<table\>] |
| 67 | \<table\> | ::= | \<box\> δ\<table\>[γ \<table\>] |
| 68 | \<table\> | ::= | \<box\> |
| 69 | \<\<reference\>\> | ::= | \|reference\| |
| 70 | \<reference list\> | ::= | \<Japanese reference\>[η \<reference list\>] |
| 71 | \<reference list\> | ::= | \<English reference\> [η \<reference list\>] |
| 72 | \<Japanese reference\> | ::= | \<numeral\> ξ\<\<PR\>\> ξ\<Japanese textline\> |
| 73 | \<Japanese reference\> | ::= | \<Japanese reference\>[η \<Japanese textline group\>] |
| 74 | \<English reference\> | ::= | \<numeral\> ξ \<\<PR\>\>ξ\<English textline\> |
| 75 | \<Japanese reference\> | ::= | \<English reference\>[η \<English textline group\>] |

The document grammar described above expresses the structure of an ordinary document, but particularly extracts the portions relating to the technical paper. The grammar will now be explained with reference to the example shown in FIG. 1. First of all, the symbols used will be explained.

| | | |
|---|---|---|
| < > | nonterminal symbol | (abstract concept) |
| < < > > | terminal symbol | (character string) |
| { } | terminal symbol | (character string in dictionary) |
| \|- -\| | terminal symbol | (substructure in image) |
| ::= | rewriting rule | |
| \| | OR (or) | |
| [ ] | omissible | |

+, ξ, η, α, β, , γ, δ are operators between substructures.

The operators are explained as follows: The operator + represents that a paper of some document continues to other page(s) of the document. The operator η represents that a subregion in an image region is vertically neighboring with another subregion in the region. The operator ξ represents that a subregion in an image region is horizontally neighboring with another subregion in the region. The operator α represents that a subregion, especially a character, in an image region is neighboring horizontally with another subregion, especially a character, in the region. The operator α is different from ξ in that the two subregions are touching each other. The operator β represents that a subregion, especially a character, in an image region is neighboring horizontally with another subregion, especially a character in the region horizontally. This operator β is different from the operators of δ and ξ as stated above in that the two subregions are placed in vertical kerning positions. The operator represents that a subregion is surrounded by other subregion, such as a rectangle, in an image region. The operator γ represents that a square subregion in an image region is neighboring horizontally with another subregion, where the two subregions are touching each other. The operator δ represents that a square subregion in an image region is neighboring with another subregion vertically, where the two subregions are touching each other.

The first rule of the grammar described above expresses that various kinds of documents are available and the technical paper is one of the kinds. The second rule expresses that a technical paper consisting only of a title page (FIG. 1, 1) exists, and the third rule represents that an arbitrary number (inclusive of 0) of pages may be added to the last of a certain paper. The fourth rule represents that on the title page, a title content (FIG. 1, 3) lies below a UDC symbol, that is, universal decimal classification (FIG. 1, 2), "author abstract" (FIG. 1, 4) lies below the former, followed then by the text (FIG. 1, 7) and finally "page number" (FIG. 1, 9). Here, the "author abstract" represents that the "author group" (FIG. 1, 6) exists on the right side of the abstract (FIG. 1, 5) as shown in the 12th rule. Furthermore, the abstract is "English textline region" as shown in the 13th rule. The author group may consist of one author as shown in the 14th rule, or may consist of a plurality of authors by adding other authors (in an arbitrary number) below the author group as shown in the 15th rule. The author consists of a horizontal combination of Japanese textline (person name) with English textline (person name) as shown in the 16th rule. Since the text (FIG. 1, 7) is provided on vertical halves one page in this embodiment, the concept of "column" (FIG. 1, 8) is introduced so that the text consists of a horizontal combination of the columns, as shown in the 18th rule. Each column consists of a continuation of sections as shown in the 19th rule. Section text consists of paragraphs as shown in the 26th rule, and the paragraphs are either Japanese textline groups or figure-tables as shown in the 27th and 28th rules. The Japanese textline consists of a horizontal continuation of Japanese characters via ξ, α and β as shown in the 30th to 32nd rules. Here, ξ represents a simple horizontal continuation, α does horizontal touch and β does horizontal over-up, and any of them will occur. The Japanese character includes hiragana, katakana, kanji, alphabet, numeral, and the like, as shown in the 45th rule.

To understand a document, an input document is first assumed to be the first document in the rule described in the document grammar, i.e., a technical paper, and it is tested to determine whether the assumption can be confirmed. To confirm the assumption that the input document is a technical paper, the input document must be one of the plurality of a title page (rule 2) or a continued page (rule 3). Thus, the subsidiary assumptions must be tested, one of which is that the input document is a title page, and the other is that the input document is a continued paper. If neither of these two assumptions are confirmed, then the first assumption, that the input document is a technical paper, is judged to be false and the next assumption, that the input document is a paperback novel, is tested. Continuing this process until some assumption is confirmed, the input document will be "understood", i.e., it is identified as one of the document types defined in the document grammar. If no assumptions are confirmed, then understanding the input document fails and the document will be rejected. It must be noted that to confirm one of the subsidiary assumptions another subsidiary assumption is generated, and so on. However, ultimate assumptions which can not be resolved anymore will be reached at the last of the sequences of assumptions and will be easily tested because they are related to basic constituents of document images, such as characters, line drawings or photographs, and they can be tested using character recognition, line drawing recognition or photograph separation techniques. At each assumption, different image processing is applied to each operator. For example, since the operator η represents that the substructures continue vertically, processing for detecting the continuation of the vertical substructure corresponds to this operator η. As an example of such processings, there is a processing which detects the continuation of horizontal white pixels. Similarly, a processing which detects the continuation of the vertical white pixels and segments a character corresponds to ξ, and a processing which detects the inclined continuation of the white pixels and then segments the character corresponds to β.

As stated above, different rules are selected automatically to confirm a more global assumption and the image processing modules, each of which corresponds to each operator, are involved to test each assumption at various levels.

As can be understood from the description given above, the document grammar proposed by the present invention describes the structure of a complicated document hierarchically and recursively. Therefore, this grammar can describe those objects which have not conventionally been easy to describe, such as those having an indefinite number of textlines and those having substructures whose appearance is indefinite. Understanding of a wide variety of documents can be made by describing the physical relation of the substructures by means of the operators and then verifying the relation expressed by the operators by image processing.

Hereinafter, preferred embodiments of the invention will be described in detail with reference to the drawings.

Figure 2:
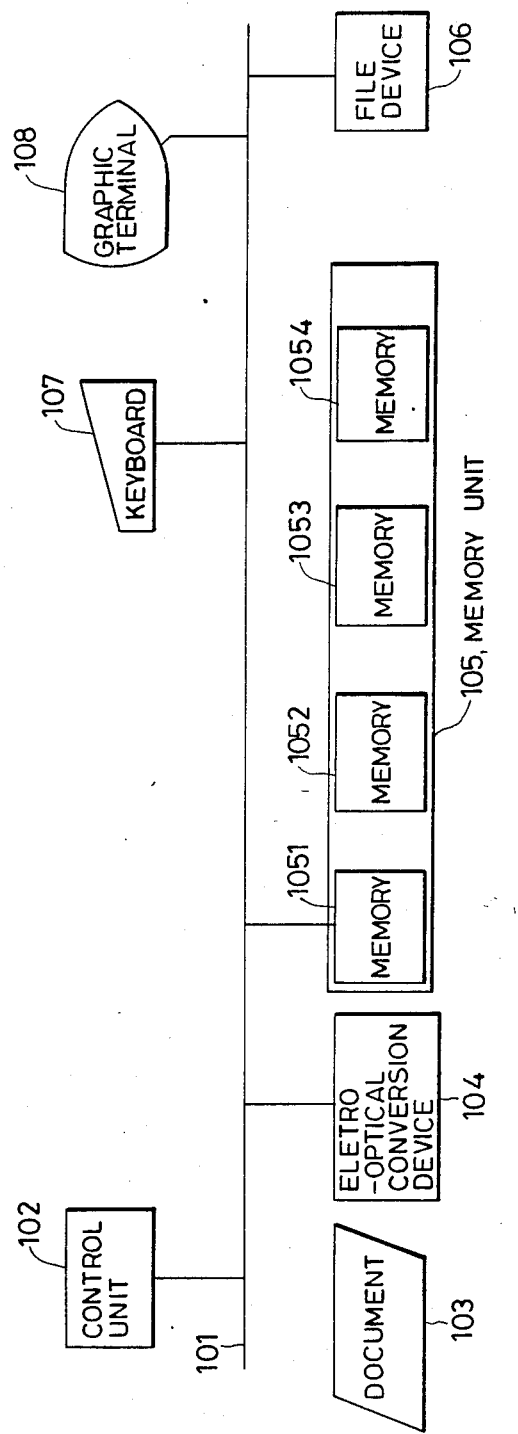
FIG. 2 shows an embodiment of the present invention.

FIG. 2 is a block diagram showing the construction of an apparatus which employs a document processing system in accordance with one embodiment of the present invention. Each constitutent portion of the apparatus is connected by a bus 101, and the overall operation of the apparatus is controlled by a control unit 102. The information (document image) on the document 103 is scanned by a photo-electric conversion device 104, is digitized and is then stored in a memory 1051 through the bus 101. The memory 1051 constitutes a part of a memory 105 in cooperation with later-appearing memories 1052, 1053 and 1054. Heretofore known efficient coding may be effected when digitizing the document information, and the memory capacity of the memory for storing the document image can be saved by so doing.

In the description to follow, digitizing is effected for one pixel per bit, but one pixel may be expressed by a multi-value, and may further be provided with color information by effecting photo-electric conversion using a color scanner. The normalized image which is obtained by applying heretofore known correction of position and correction of rotation to the document image by the control unit 102 is stored in the memory 1052. Document understanding is effected to this normalized image by the program control of the control unit 102 in the following manner, and the result of understanding is applied to a file device 106.

Figure 3:
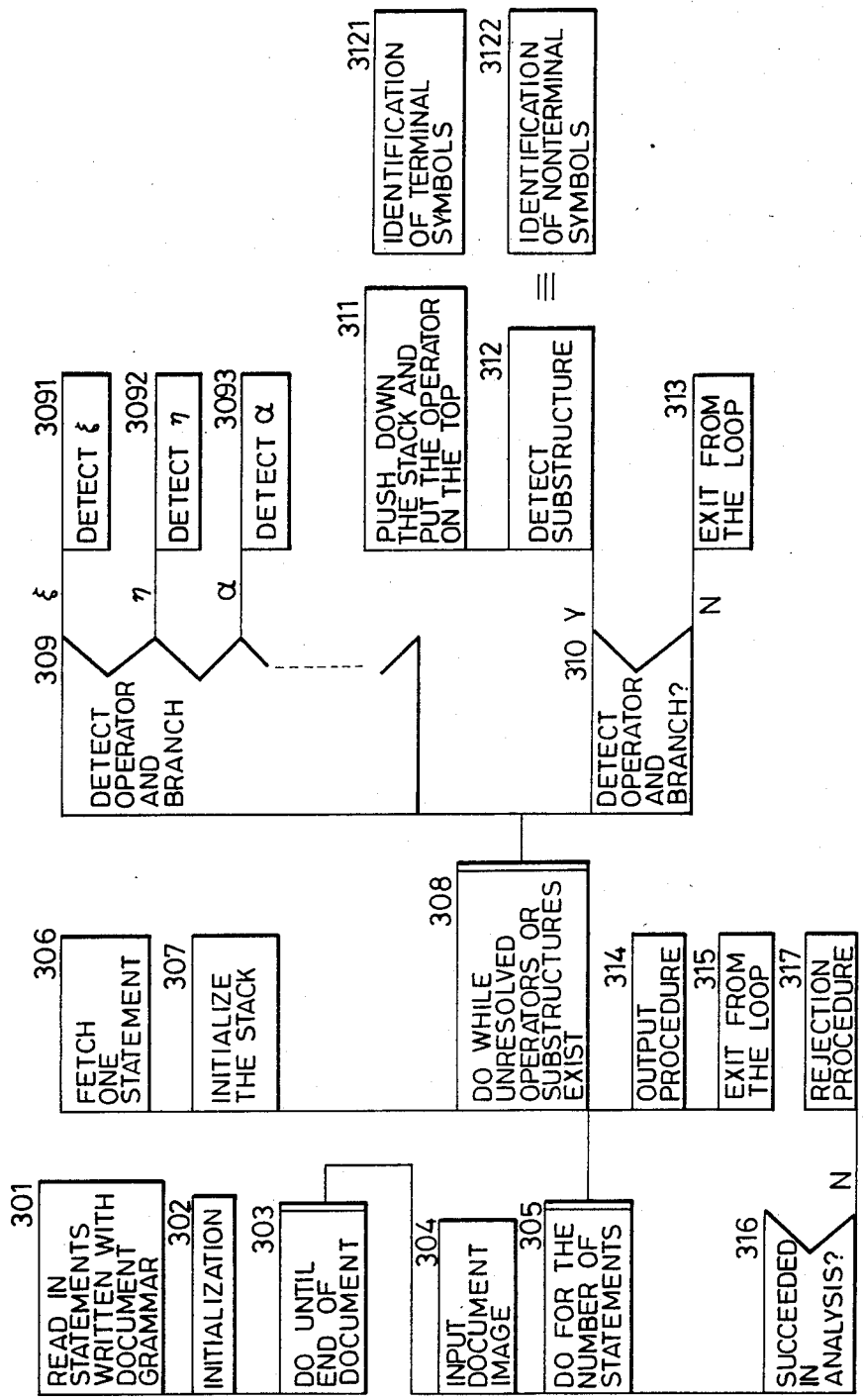
FIGS. 3, 4, 5 and 6 are flowcharts useful for explaining the processing at a control unit shown in FIG. 2.

FIG. 3 is a flowchart showing the flow of processing of document understanding in a PAD (Problem Analysis Diagram) style.

Before explanation of the figure, it will be necessary to explain the PAD style to represent flows of processing. In a PAD, units of processes are represented as square boxes and placed incident to vertical lines according with the sequence of processing. Two special boxes are used to control the processing flow. One of them is a control of repetition and represented as a box with a pair of vertical lines at the right side of the box, where a horizontal line runs in a right direction from the center of the right side of the box. The processes included in the repetition are placed at the right hand side of the control box and connected with horizontal and vertical lines. There are three types of repetition which are a finite loop of so-called "DO" type, and two infinite loops of "INTIL" and "WHILE" types. These three types can be distinguished by the sentences written in the box. Another special box is a control box used for branching and is represented as a box whose right side has a saw-tooth shaped line. Each corner point of the saw-tooth corresponds to a branch selected by the condition(s) stated in the box. The equation(s) evaluated in the test of branching is written in the box and the condition(s) of the branching is written near the horizontal lines drawn from the corner points of the saw-tooth shaped side.

In FIG. 3, at step 301 statements describing the formats of documents written according to the document grammar stated above are read in from an outside file device (not shown).

Step 302 is initialization of the whole. Step 303 is an iteration loop which iterates the following processing until the end of the document. The image of one page is applied at step 304. Step 305 is loop control which interprets this page in accordance with the document grammar. At step 306, one statement is extracted, and parsing is effected at steps 307 and so on and whether or not this one statement is to be accepted or rejected is decided. Initialization of the stack used for the subsequent parsing operation is effected at 307. The stack is placed in the memory 1054. Step 308 controls the flow of processing from step 309 to step 313. Step 309 detects the existence of operators, and is a group of branches to the processings that correspond to the operators 3091–3093, respectively. 3091, 3092 and 3093 are image processing corresponding to the operators $\xi$, $\eta$ and $\alpha$, respectively. These image processings will be described in detail elsewhere. Step 310 detects whether or not the operator(s) exists, and if not, the processing exists at step 313 from the loop of 308 and so on and shifts to the processing (307) of the next textline. If the operator exists, the stack is pushed down and the operator is placed on the top at step 311, and step 312 detects the existence of a substructure. Detection of the substructure consists of a portion 3121 which identifies the terminal symbol and a portion 3122 which identifies the nonterminal symbol.

The processing of 3122 is made by recursively effecting the processing of step 307 and so on for part of the statement. Identification of the terminal symbol is a processing which effects character recognition in the case of numerals, for example, and decides whether or not the recognized result belongs to the group of numerals.

When the interpretation of all the substructures and operators is completed in the manner described above, understanding of this page in the document is completely finished. The result of document understanding includes the substructures in the stack (memory 1054) and its content (character string), and the operators between the substructures. After being converted to prescribed codes at step 314, these results are outputted to the file device 106. If interpretation is not possible in any statement of the grammar, this document can not be understood. This is the case where the procedure exits from the loop at step 313 for all the textlines, and this state is decided at step 316. If the document can not be understood, a reject procedure is effected at step 317. For instance, the final result of document understanding is displayed on a display 107, and is corrected by man-machine interaction using a keyboard 108.

Figure 4:
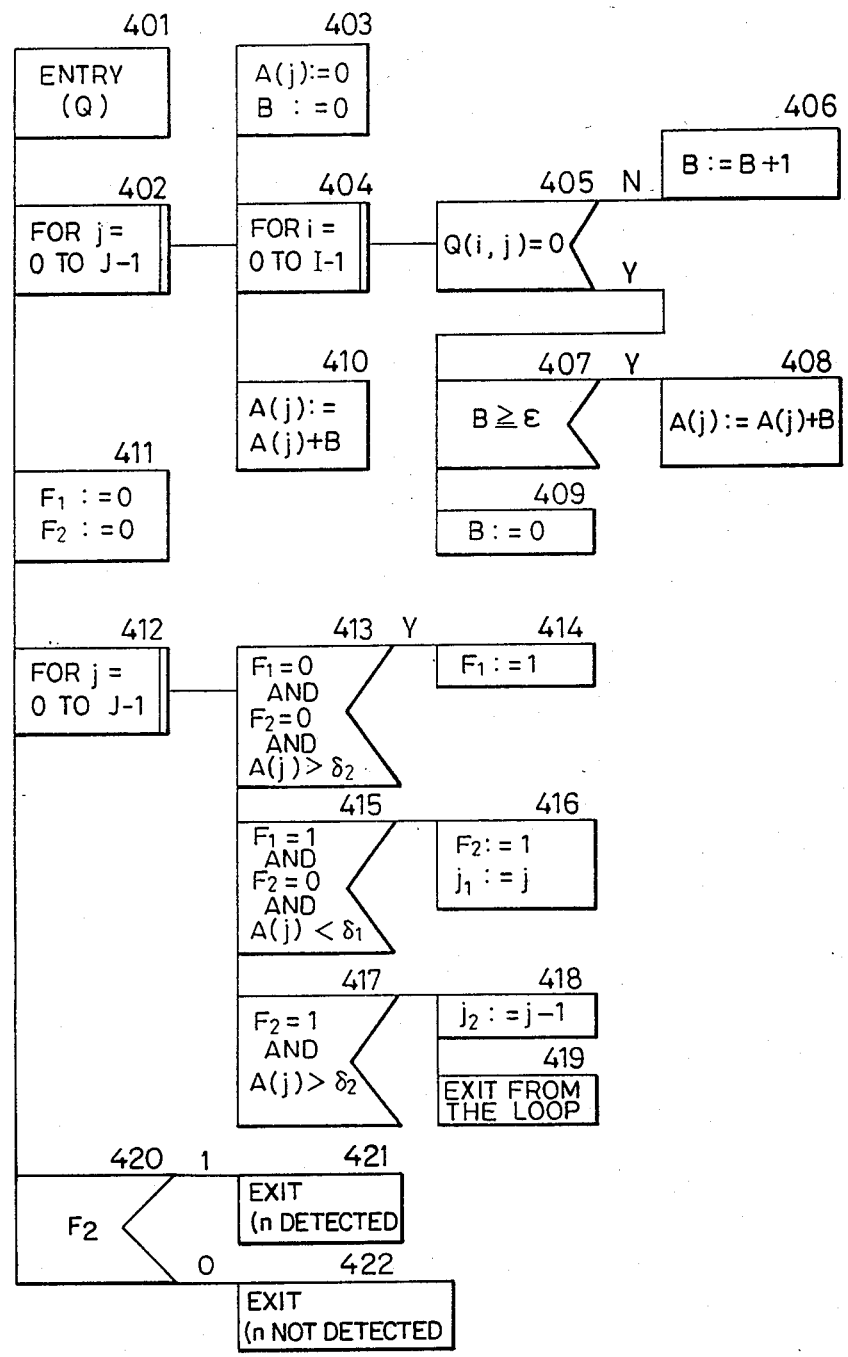

FIG. 4 is a flowchart expressing image processing for the operator $\eta$ described at 3092 in FIG. 3, that is, a processing which detects the horizontal continuation of the white pixels, in the PAD style. In FIG. 4, step 401 is an entry to the main processing, and a normalized image Q stored in the memory 1052 is given. At step 402, processings of steps 403–409 are iterated for the ordinance of scan line j to obtain the sum of black pixels in a long run A (j). Step 403 is an initialization step. Step 404 decides whether the pixel Q (i, j) in the scan line is 1 or 0, and if it is 1, the run length B of black pixels is counted at step 406. If Q (i, j) is 1, summation processing is effected at step 408 when the run length B till the previous pixel is found greater than a threshold $\epsilon$ by the decision at step 407, and the sum length B is reset at step 409. After completion of the loop, B is added to the sum A (j) at step 410, because in the loop from the step 404 and so on, summation at the rightmost pixel ($i=I-1$) is not effected. Since the decision of step 407 is added, summation is effected for A (j) only when a relatively long run of black pixels exists, so that the influence of noise is not so much great.

The procedure from steps 411 to 420 is a processing which detects that a region smaller than the threshold δ1 in the A (j) is interposed by a region greater than the threshold δ2. Step 411 is initialization of flags F1, F2. Step 412 iterates the procedures of 413-419 for the ordinant of scan line j. Step 413 detects that A (j) at a first time goes over the threshold δ2, and the flag F1 is set at step 414. Step 415 detects that A (j) at a first time goes under the threshold δ1 under the state of F1=1, and the flag F2 is set at step 416 and at the same time, j at this time is stored as j1. Step 417 detects the point at which A (j) goes over the threshold δ2 under the state F2=1, and the previous value of J1 is stored as j2 at step 418 and procedure exits from the loop of 412 and so on. Step 420 is a branch and selects a step 421 on success of detection of the operator η and a step 422 on failure. Whether the detection has succeeded or fails can be decided by seeing the flat F2, because F2=1 represents that both the beginning point j1 and the ending point j2 of a white area which is sufficiently wide horizontally and separates two black regions have been found and, on the contrary, F2=0 represents that such points have not been found. Step 421 is an exit when the detection of the operation has succeeded and parameters F2, J1 and j2 are passed to the routine outside to show the existence of the operator η and the positions where the operator exists. Step 422 is an exit when the detection of the operator η failed and parameters F2, j1 and j2 are also passed to the outside, but in this case only F2 has a meaning and j1 and j2 have no sense.

Next, the second embodiment of the present invention will be described. Though this embodiment is realized by the same block diagram as that of the first embodiment, the document grammar to be used is somewhat different. In other words, the operators representing the relation between the substructures such as ξ, η, α, β, , γ, δ are connected by parameters representing the physical quantities, and are expressed for example, in the following way.

ξ(1, 5), η(3, 10), . . .

Figure 5:
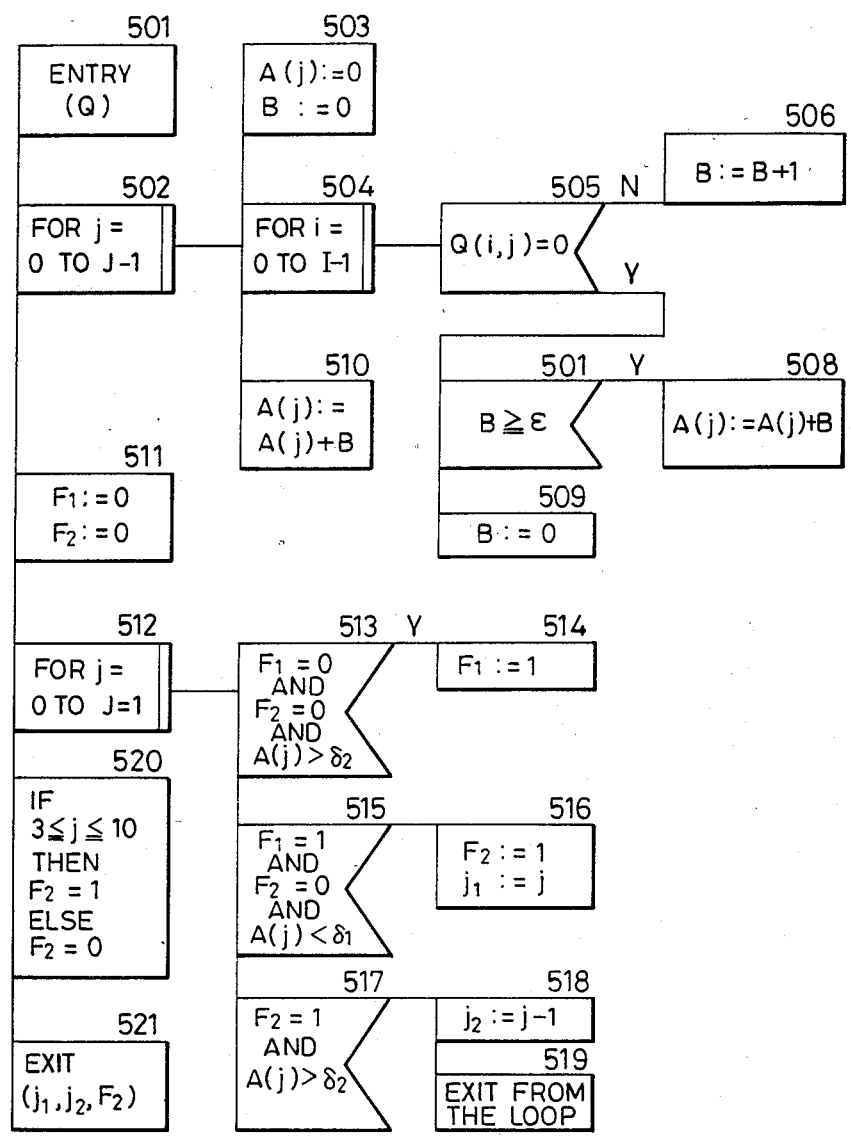

In this case, η (3, 10) represents that clearance of at least 3 mm and up to 10 mm exists in the vertical direction. The flowchart of the first embodiment for detecting the operator η (FIG. 4) is changed to FIG. 5. In FIG. 5, the procedures from the steps 501 to 519 are the same as those of steps 401 to 419 of FIG. 4. Step 520 decides that the run of white pixels detected at steps 512-519 is from 3 to 10. Step 521 is the same as the step 420. The statement of the document grammar used in the second embodiment is somewhat more complicated than the statement of the document grammar of the first embodiment, but it has the advantage that the erroneous judgement in document understanding can be more easily avoided. This grammar is suitable for processing of documents having relatively less fluctuation of formats.

Next, the third embodiment of the present invention will be described. Though this embodiment can be realized by the same block diagram as that of the first embodiment (FIG. 3), the flow of control is different from that of the first embodiment (FIG. 3), and is such as shown in FIG. 6.

Figure 6:
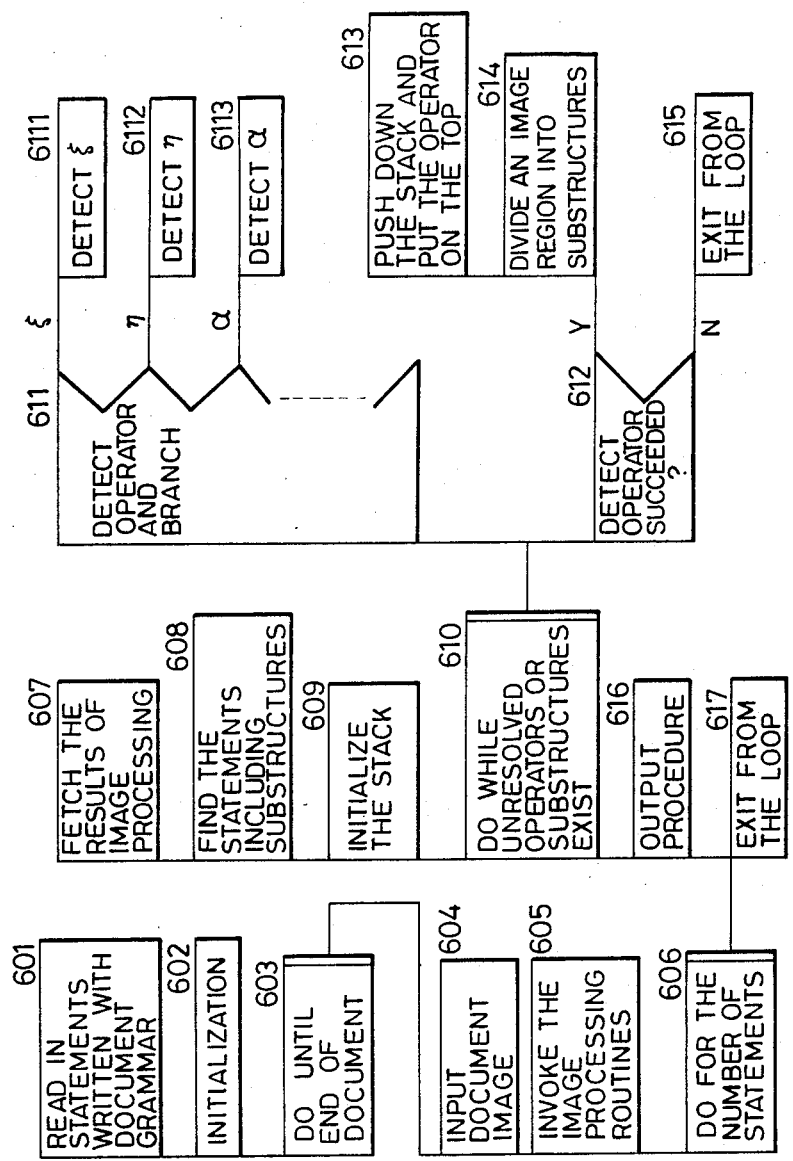

FIG. 6 is a flowchart representing the flow of processing of document understanding in the third embodiment in the PAD style as explained with reference to FIG. 3. First of all, statements written with document grammar are read into the memory 53 from the file device (not shown) at step 601, and initialization of the whole system is effected at step 602. Step 603 is an iteration loop which iterates the following procedures till the end. The image of one page of the document is inputted at step 604, and an image processing routine is invoked at step 605. At this time, which area in the image is to be processed is designated. The image processing routine operates in parallel with the interpretation of statements, which will be described below, using multiprogramming or a multiprocessor, directly extracts figures, tables, characters and other terminal symbols from the image to be processed, and presents the data, which represent extraction, into a specific address in the memory.

Step 606 is a control loop which interprets this page in accordance with the document grammar. At step 607, the result of image processing is examined, and the statement describing its substructure is searched at step 608 in accordance with the extracted result. Since this processing is carried out in parallel with image processing, completion of the image processing must be awaited.

Step 609 effects initialization of the stack used for the subsequent processing. Step 610 processes for the textline, and controls the flow of processing from steps 611 to 615. Step 610 is the same as step 309 in FIG. 3. Step 612 detects the existence of the operators and if they do not exist, the procedure exits from the loop of steps 609 and so on. If they exist, the stack is pushed down and the operator(s) is put on the top. At step 613, one of the operators, say η, is detected and the parameters showing the detection of the operator are put on the stack pushing down the stack before doing so. At step 614, the parameters of substructures, such as j1 and j2 for η (in FIG. 4), are extracted by known methods and the image region is divided into substructures using these parameters. At step 615, if the detection of no operator has failed, exit from the loop immediately. In this case, the stack has not been changed and the failure of detection is represented implicitly by no existence of the operator at the top of the stack. Detection of the substructure is effected recursively for the rest of images other than the portion detected by the image processing routine, but since it is fundamentally the same as in FIG. 3, it is hereby omitted. Steps 616 (output of the final result of document understanding) and 617 are the same as those in FIG. 3. Although the third embodiment is more complicated than the first embodiment, the processing is faster in this embodiment because the results of image processing excitates the parsing of the grammar so that the irrelevant portion of grammar may not be parsed.

Figure 7:
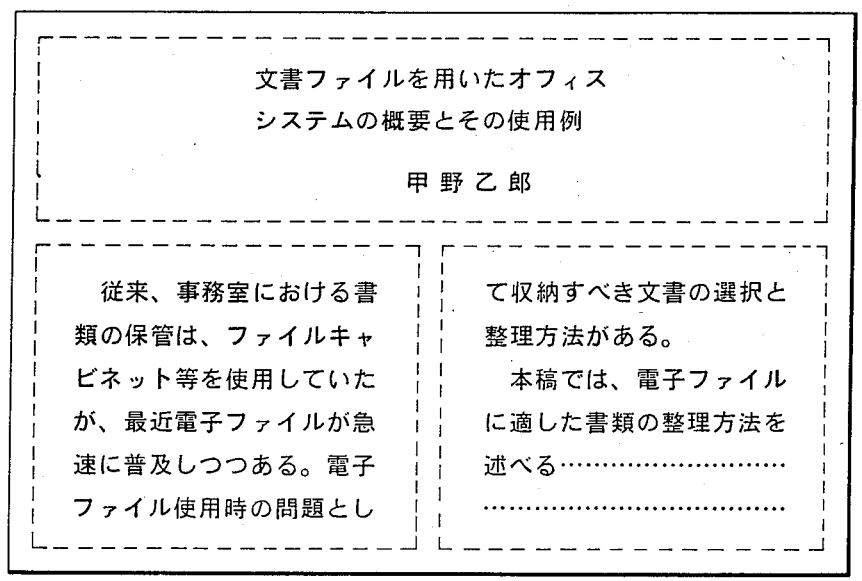
FIG. 7 is a referential view showing an example of documents.

Next, the parsing method will be explained before the description of the fourth embodiment of the present invention. FIG. 7 shows an example of one page of a technical paper having a predetermined format. Though the following description is directed to technical paper, the present invention can be applied also to other documents by changing a part of the document grammar because the form of grammar is somewhat different. Therefore, the present invention is not particularly limited to this example of the technical paper.

The following is an example of a grammar describing the structure of the document (hereinafter referred to as the "document grammar").

(defform F
(form F1 (10 90 10 40))

```
    (form F2 —)
    (form F3 —))
(defform F1
    (form F11 (10 90 10 50))
    (form F12 (10 90 60 90)))
(defmac LINE-1 (% 1)
    (point ? Y1 (mode IN Y LESS)
    (point ? Y2 (mode OUT Y LESS)
    (form % 1 (0 ? W ? Y1 ? Y2)))
```

The grammar described above will be explained with reference to the example of FIG. 7.

The first symbol "deform F . . . " represents that the format F consists of a format F1 and a horizontal continuation of formats F2 and F3 below the format F1 and shown in FIG. 8. In FIG. 7, the portions of F, F1, F2 and F3 corresponding to FIG. 8 are encompassed by dashed line. The four numeric values in the parentheses 10, 90, 10, 40 next to the format F1 represent the position of the region of the format F1 when the full region corresponding to the format F is expressed as 100×100. Here, the coordinate system has its origin at the upper left. The numeric values representing the region are a minimum value of X-ordinate, a maximum value of X-ordinate, a minimum value of Y-ordinate and a maximum value of the Y-ordinate. When the parameter values are already known as in this embodiment, the values may be directly written. Similarly, the formats F2 and F3 are described by rectangular regions.

The next symbol "deform F1 . . . " represents that the format F1 consists of formats F11 and F12 that are located vertically. In other words, the region of the format F11 in the Y direction is from 10 to 50, and that of the format F12, from 60 to 90. The positions of the regions of the formats F11 and F12 are described in the coordinate system using the origin at the upper left of the format F1. Therefore, when viewed from the format F, it is a relative coordinate system.

In the manner described above, when the format is described by the rectangular region and is described hierarchically as a group of the regions one after another, the image can be described in a general form. It is of course possible to describe by the absolute coordinate system with the format F being the reference without using the hierarchical expression, as shown in FIG. 9. In such a case, the rectangular regions can be designated in the following way in the same way as in FIG. 8.

```
(deform F
    (form F11 (18, 82, 13, 25))
    (form F12 (18, 82, 28, 38))
    (form F2)
    (form F3)
```

The subsequent symbols "defmac LINE−1 (%1)" and so on are definition of macro-statement. The following description of the three textlines as the main body of the defination of macro-statement expresses that the first line from above the rectangular region is format %1.

```
(point ?Y1 (mode IN Y LESS))
(point ?Y2 (mode OUT Y LESS))
(form %1 (0 ?W ?Y1 ?Y2))
```

Here, symbol ?W represents the vertical size (height) of the format and symbol ?H does the horizontal size (width) of the format. Symbols ?Y1 and ?Y2 are variables that are identified by search, as will be described next.

Symbol "point" represents the search of a point that satisfies a certain condition, and substitution into the variable. The search condition is designated by "mode". "IN-OUT" represents that the search point is a change point from a region of white pixels to a region of black pixels, or a change point from the black pixels to the region of the white pixels. "Y" represents the axis of search and "LESS" does the search direction. Symbol "area" represents a region within the range of search.

Figure 10:
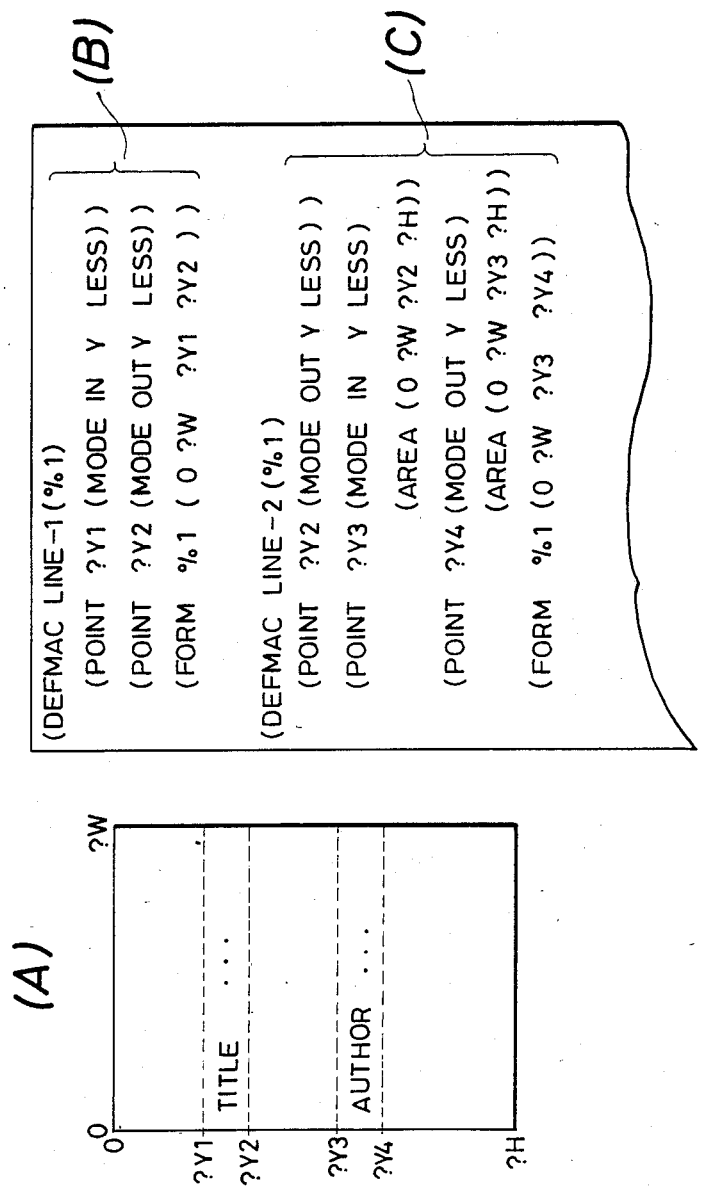

The search method will be explained about the case of the statement of the definition of macro-statement by way of example, with reference to FIG. 10.

Symbol (A) represents that the textline "Title . . . , Author . . . " exists in the format. (B) and (C) presents the coordinate values of these textlines in the Y direction, that is, the first and second lines. The first line exists from ?Y1 to ?Y2, and the second line exists from ?Y3 to ?Y4. As described above, (B) is the macro-statement that defines that the format of the first line is %1, and (C) is a macro-statement defining that the format of the second line is %1. The usage of these macro-statement is as follows.

```
(LINE - 1F1)
(LINE - 2F2)
```

In other words, the statement of the first line is F1, and the format of the second line is F2. The condition of search of the coordinate value ?Y1 designated by the "point" of the second line of (B) is IN Y LESS. Therefore, the search condition is such that the change point from the region of the white pixels to the region of the black pixels and the axis of search are Y, and its direction is LESS, that is, search is made from the Y-ordinate having a smaller value. When search is to be made from the Y-ordinate having a greater value, designation GREATER must be made. The upper bound ordinate value ?Y1 satisfies these conditions. The lower bound ordinate value ?Y2 of the first line designated by the "point" in the third line of (B) under the search condition described above may be described as the change point from the region of black pixels to the region of white pixels. In other words, the condition of search of ?Y2 is OUT Y LESS.

Next, (C) which defines the second line in the format will be explained. The second line is next to the first line. Therefore, the lower bound ?Y2 of the first line is searched, and ?Y3 represents the region within the range of search by area. In other words, similar search can be made from the lower bound of the first line by describing the rectangular region as the object of search as

| 0 | ?W | ?Y2 | ?H |
|---|----|----|----|

In document understanding, the statements written with document grammar are referred to, and whether or not the rectangular region described therein exists is sequentially examined. When the rectangular region described while including variables is searched, the numeric values of the variables can be obtained, and the numeric values are thereafter used in substitution to the variables.

Next, the operation between the rectangular regions will be explained. In an actual document, regions having shapes other than the rectangular shape appear. FIG. 13(A) and (B) show examples of regions having shapes other than the rectangular shape. (C) shows an example of a region which is broken into two regions. As represented by dashed lines, FIGS. 13(A) and (B) can be considered as the union or difference of two rectangular regions. Description of (C) will become simple by assuming that it virtually consists of two rectangular regions that together form one rectangular region. The virtual transposition of the region is defined in the following manner in order to make it possible to make the operation between these rectangular regions.

```
(map & form F
    (space ?W ?H)
    (position
        (( ?XO ?YO)
        (?Xmin ?Xmas ?Ymin ?Ymax))
    ( ... ))
```

Figure 14:
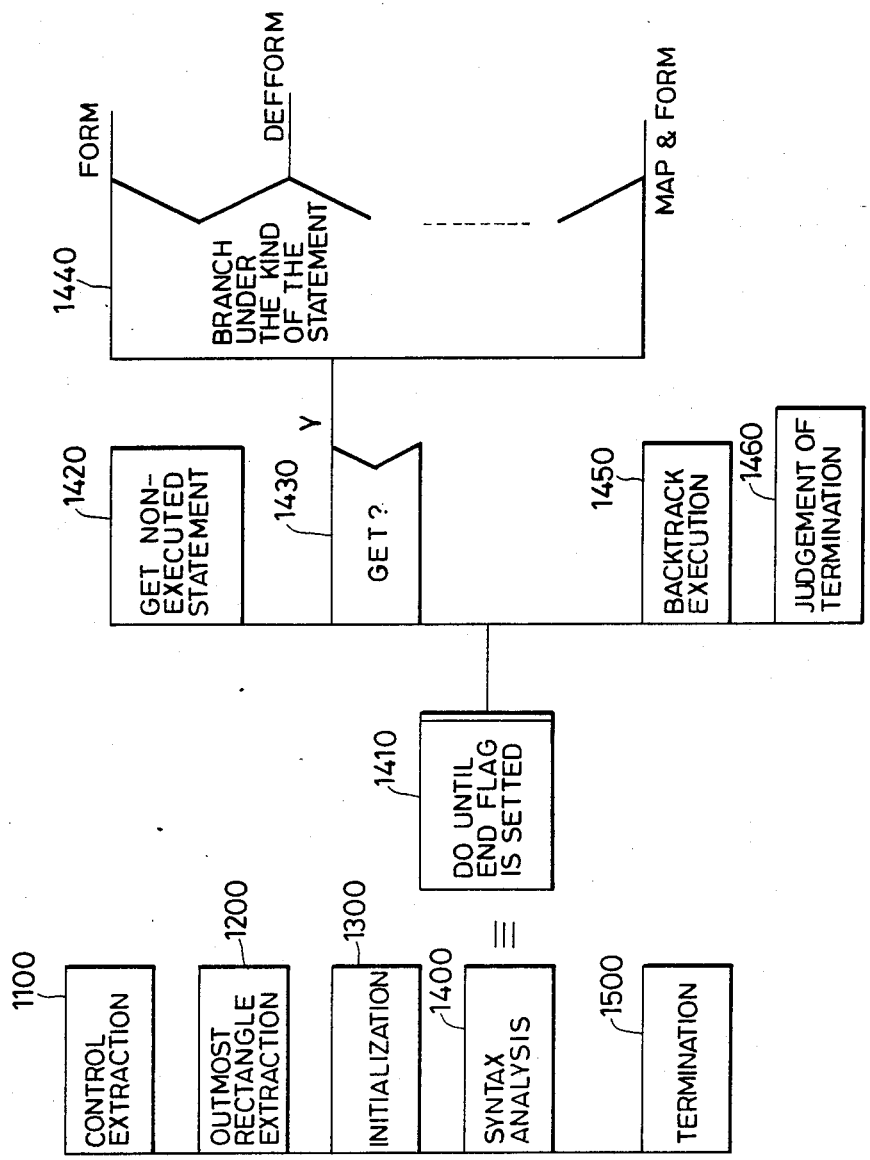
FIGS. 14 and 15 are flowcharts useful for explaining the processing at the control unit 102 in the fourth embodiment of the present invention.

FIG. 14 shows the meaning of this definition. The term "space" represents that a rectangular region having a width ?W and a height ?H is set afresh as a format F, and transposition is made into this region. The term "position" represents the upper left coordinates of the rectangular region of the destination of transposition. The rectangular region of the destination of transposition expressed by four values (?Xmin ?Xmax ?Ymin ?Ymax)

are copied to the destination of transposition described above.

This virtual transposition will be described more definitely with reference to FIG. 13. It will be now assumed that an actual format as the object of analysis is located such as shown in (A). This is referred to as "Multicolumn" or "double column". The formats F1 and F2 are located spatially as the horizontal neighbors with each other, but semantically they must be thought to be located as the vertical neighbors as shown in (B). The operation between the rectangular regions can be expressed as follows.

```
(map & form F
    (space 50 60)
    (position    ((10 10) (10 40 10 40))
                 ((10 40) (40 70 10 30))))
```

The virtual format shown in (B) sets a rectangular region having a width 50 and a height 60 by "space". The relation between (B) and (C) is expressed as follows.

```
(position ((10 10) (10 40 10 40))
          ((10 40) (40 70 10 30)))
```

The rectangular region (10 40 10 40) in (B) is transposed to the region having its origin at (10 10) in (C).

If the virtual transpositions described above are combined, a region having a complicated shape shown in FIG. 13 can be expressed by the operation between at least two rectangular regions. For example, FIG. 13(A) can be expressed as the transposition of two rectangular regions having different sizes while keeping them adjacent to each other.

As can be understood from the description given above, the document grammar proposed in the present invention represents the structure of the document as the combination of the rectangular regions and expresses the relation between the rectangular regions by the grammar. Therefore, the expressibility of the document can be increased, and those objects whose handling has been difficult conventionally in such a case where the number of textlines in the region is insufficient or a case where the appearance of a specific rectangular region is indefinite, can now be described. Therefore, a wide variety of documents can be analyzed.

Hereinafter, the fourth embodiment of the present invention will be described with reference to the drawings.

This embodiment is practiced by the apparatus shown in the block diagram of FIG. 2 in the same way as the first embodiment, but processing of the control unit 102 is different. It will be assumed that the statements of the document as the object written with the document grammar described already are stored in advance in the memory 1053. The control unit 102 effects document understanding processing of the normalized image using these statements. Here, the term "document understanding processing" means to segment the data into a plurality of rectangular regions and to classify each region. Among the regions obtained as the result of document understanding processing, the image of the portion of a predetermined region as the object of retrieval is sent to a character recognition unit 6 to recognize the internal character pattern. Generally, original document images have complicated shapes, but since the region obtained as the result of document understanding is rectangular, character segmentation and recognition can be made easily in accordance with known methods. The character code string obtained as the result of character recognition or the character code string obtained by editing the former is retrieval information of the input document. The retrieval information of the input document thus obtained and the digital image of the document are produced to the file device 106. When outputting the digital image of the document to the file device 106, it may be outputted separately in the unit of a plurality of divided rectangular regions.

Figure 15:
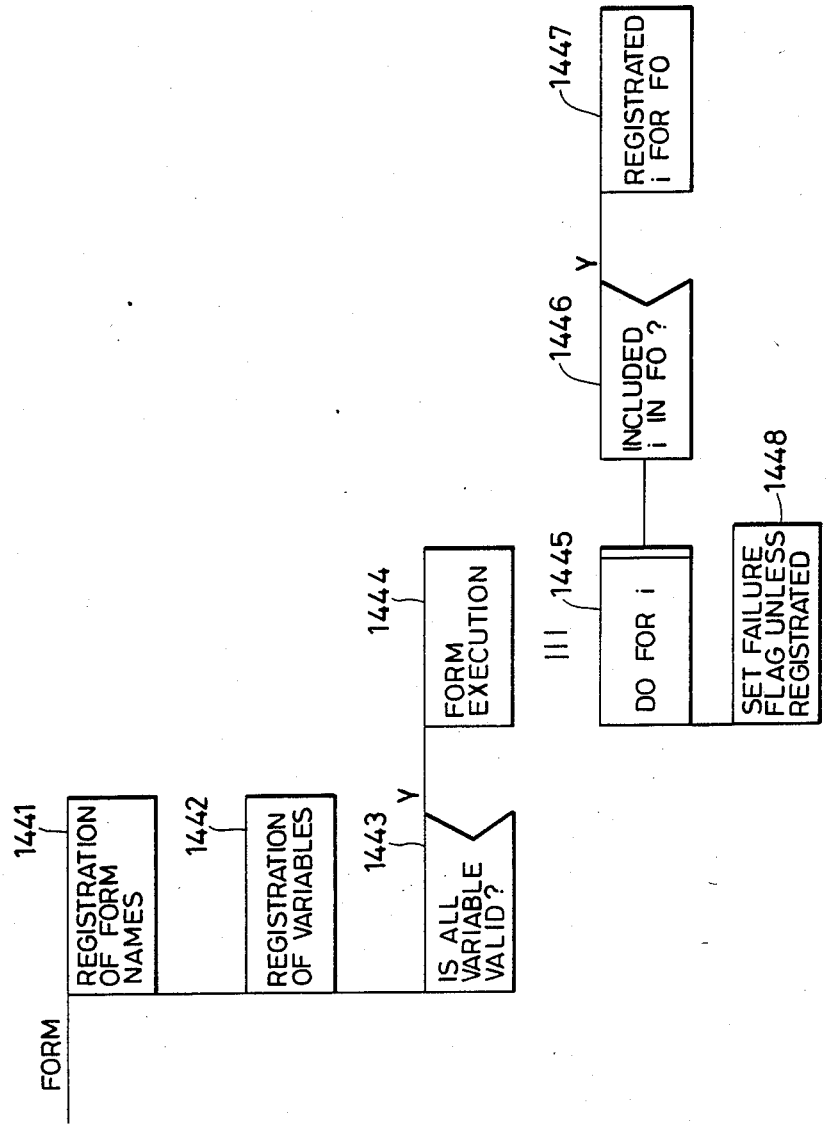

Hereinafter, the document understanding processing will be described in detail. FIGS. 14 and 15 are flow-charts useful for explaining the flow of control of document understanding. The flow of control is written in the PAD (Program Analysis Diagram) style. Contour extraction of the document image is effected at step 1100 and is stored in the memory 1054. Known methods may be used for contour extraction. So-called "connected region extraction" may also be used in place of contour extraction. The maximums and minimums of the X- and Y- ordinates Xmin(i), Xmas(i), Ymin(i), Ymax(i)

are extracted from each contour i extracted at step 1200. The outmost rectangle of the contour i can be determined from these four numeric values. Steps 1300, 1400 and 1500 are initialization, main body and judgement of termination of the parsing processing, respectively. At step 1300, the statements written with the document grammar, that are stored in the memory 1053, are copied to the work memory 1055, and various tables and variables in the program are initialized.

. The main body of 1400 syntax analysis consists of 1410 through 1460. Step 1410 makes control so that the procedures from 1420 to 1450 are repeated until judgement of termination is effected at 1460. A statement in the statements written with the document grammar is extracted at 1420. The term "unresolved statement" represents those textlines which contain such variable(s) whose value is not yet determined, or those textlines for which corresponding document regions are not yet determined. Judgement is made at 1430 so that if the unresolved statement does not remain, the procedure of step 1440 is to be skipped. In this case, judgement of termination is executed. If the statement extracted at step 1420 is an unresolved statement, the procedure of step 1440 is executed. This is the portion which judges and branches the kinds of statements, and the content of processing changes with the kinds of statements. The explanation on FIGS. 14, 15 and so on deals only with the "form statement", that is, the case where

```
(form FO
 (?Xmin ?Xmax ?Ymin ?Ymax)
 (shrink ?X ?Y))
```

However, as to the other statements, too, processing peculiar to these statements is executed.

In FIG. 15, 1441–1448 are portions which process the predicate "form". Step 1441 checks whether or not the format label F0 is registered, and if not, it is registered to the format table at step 1442. Step 1442 checks whether the character string written to the positions of the variable names ?Xmin, ?Xmax, ?Ymin, ?Ymax, ?X, ?Y are variables or numerics, if they are variables, whether or not they are registered, and if they are not yet registered, they are registered to the variable table. If the variables are already registered, whether or not the values are determined is checked. If they are not, the "form" processing is completed. (In this case, this statement is the unresolved statement.) If they are determined, the variable name in the statement is replaced by the value described above.

As a definite example, when

```
?Xmin = 0, ?Xmax = 90,
?Ymin and ?Ymax: not registrated
?X = 5, ?Y = 5,
``` the statement described above can be replaced as follows:

```
(form FO
 (0 90 ?Ymin ?Ymax)
 (shrink 5 5),
``` and the variables ?Ymin and ?Ymax are registered to the variable table and the values are indefinite.

At step 1443, branch is effected depending upon whether or not the variable names in the statement are all replaced by the numeric values, and if all are replaced, the "form" execution procedure of step 1444 is effected. The detail of the "form" execution is represented by 1445–1448. Step 1445 represents that the following procedures are iterated for the contour i extracted at step 1200. At step 1446, the minimums and maximums of the X- and Y-ordinates of the contour i, that is, Xmin(i), Xmax(i), Ymin(i), Ymax(i)

are compared with the numeric values corresponding to the variables in the statement, that is, ?Xmin, ?Xmax, ?Ymin, ?Ymax, ?X, ?Y and whether or not this contour satisfies the following relation is checked:

| ?Xmin< | Xmin(i)< | Xmas(i)< | ?Xmax |
|---|---|---|---|
| ?Ymin< | Ymin(i)< | Ymax(i)< | ?Ymax |
| ?X< | Xmax(i)– | Xmin(i) | |
| ?Y< | Ymax(i)– | Ymin(i) | |

When the condition described above is satisfied, the contour i is registered to the component table of F0 at step 1447. When the contour satisfying the condition described above does not exist, step 1448 sets the flag of failure of parsing.

As described above, the procedures of steps 1441 to 1448 can detect whether or not the structure corresponding to the statement "form" exists in the input image. This also holds true of the statements other than the "from" statement. In the case of "from", no output data exists, but depending upon the statements, there is a statement whose variable is replaced by the parameter obtained at the time of analysis, and its result is used for the other statements.

Step 1450 examines the analysis failure flag, and when analysis fails, backtrack and retrial are then made. In this case, control is made so that the procedure is returned to the resolved statement, the variable replaced by the parameter is written once again to the original state, and other possibilities are searched.

Step 1460 detects whether or not the analysis failure flag is set or whether or not the analysis failure flag is set after the backtrack and retrial, and makes judgement of termination.

Step 1500 is a portion which passes the data obtained as the result of analysis to the outside. The data to be passed to the outside include the coordinates of the rectangular regions on the document detected corresponding to the format label, and the like.

When the analysis fails for the statement having the designation to set the analysis failure flag, this document can not be understood. In this case, the procedure for rejection is executed. For example, the final or intermediate result of document understanding is displayed on the display 108 and is corrected by man-machine interaction.

Next, the content of the "form" execution will be explained definitely with reference to FIG. 16. FIG. 16(A) shows the case where a noise ( ) and character 1, A, 2, B pattern exist in the image.

FIG. 16(B) shows the case where the parameter at the time of execution of the "form" statement is

```
(form F (20 80 10 50)        (shrink 0 0)).
```

FIG. 16(C) shows the case where the parameter at the time of execution of the "form" statement is

```
(form F (20 80 10 50)        (shrink 5 5).
```

As shown in the drawings, the noise and the character 1, A pattern are registered to the element table of the format F in the case of (B), and in the case of (C), the noise is not registrated but is eliminated by shrink designation, though the character 1, A pattern is registrated. After the execution of "form", the rectangular region of the format F can be normalized by the character pattern contained in the region as shown in the drawings, and hence the size of the region can be flexibly identified.

Figure 17:
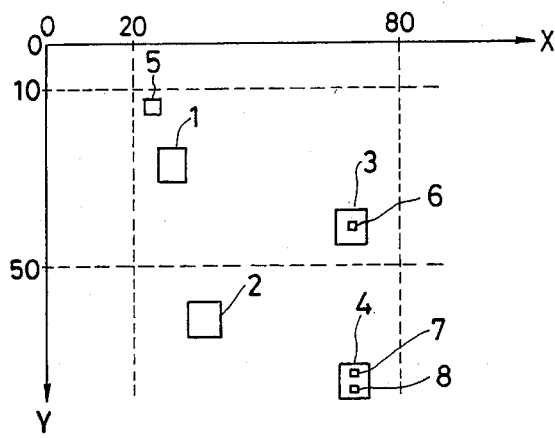

The selection method of the contour at the time of execution of "form" will be explained definitely with reference to FIG. 17. FIG. 17(A) shows the outmost rectangle as a result of processing of the image composed by contours at step 1200 in FIG. 14. Reference numeral 5 represents the noise, 1 through 8 are character patterns and 6 through 8 are so-called "inner contour". FIG. 17(B) shows their Xmin, Xmax, Ymin and Ymax. Whether or not they are contained in the format F is judged by whether or not the following relation are satisfied:

$$20 < Xmin(i) < Xmax(i) < 80$$
$$10 < Ymin(i) < Ymax(i) < 50$$
$$5 < Xmax(i) - Xmin(i)$$
$$5 < Ymax(i) - Ymin(i)$$

In this case, the contours i=1 and 3 are satisfied. Since the character pattern of 3 contains the pattern of 6, it may be eliminated from the format F.

As described above, the present invention makes it possible to automatically parse the object document to be stored. Since the input of the secondary information from the keyboard is not necessary or can be drastically reduced, the input can be remarkably simplified. Furthermore, since the inputted documents are resolved into substructures, the saving of storing spaces of files by storing these substructures in place of document images or the advanced retrieval using the substructures can be realized.

What is claimed is:

1. A system for automatically understanding structure of an image provided by a document having an unknown structure comprising:
    means for optically scanning an input image and for converting said input image to a digitized image by photoelectric conversion;
    means for storing said digitized image;
    means for storing statements written in accordance with a grammar describing hierarchically an image structure of a document as a group of substructures by means of a plurality of rules defining conditions under which respective substructures exist in a document and relative positional relation and clearance between said substructures on the document, wherein each of said substructures has a format label of the document, and wherein the image structure of the document is described in a general form;
    means for reading out sequentially said statements of a document from said means for storing statements and for searching whether any of a plurality of regions of said document satisfy any one of said conditions to thereby indicate the existence of a substructure in said input image;
    means for identifying actual regions corresponding to substructures indicated as existing in said input image on the basis of a result of operation of said means for reading and searching and for classifying said identified actual regions in accordance with respective format labels of said existing substructures.

2. A system for automatically understanding according to claim, wherein said substructures and their relative positional relation are described by operators designating characteristic features of the document.

3. A system for automatically understanding according to claim 2, wherein said substructures contain operators representing that said substructures are separated by a run of horizontal or vertical white pixels.

4. A system for automatically understanding according to claim 2, wherein said operators are related to one another by physical parameters.

5. A system for automatically understanding according to claim 1, wherein said grammar is described as a group of plurality of rectangular regions.

6. A system for automatically understanding structure of an image provided by a document having an unknown structure, comprising:
    means for storing statements written in accordance with a grammar describing a generic layout structure of a document as a group of rectangular regions where each region can be recursively defined in terms of smaller regions, each of said regions having a format label of the document and said statements include conditions for defining when respective regions exist in the document, said conditions are satisfied by searching the document, wherein the image structure of the document is described in a generic form;
    means for converting an input image to a digitized image by photoelectric conversion;
    means for storing said digitized image;
    means for extracting rectangular regions from said digitized image;
    means for matching said statements stored in said means for storing with said rectangular regions extracted from said digitized image according to said conditions and for identifying a location of each rectangular region in the document described in a generic form; and
    means for classifying said identified rectangular regions corresponding to a format label thereof and for recognizing characters within the regions.

7. A system for automatically understanding according to claim 6, wherein said grammar contains numeric values representing absolute or relative sizes of said rectangular regions as variables, and numeric values representing an absolute or relative positional relation between said rectangular regions as variables.

8. A system for automatically understanding according to claim 6, wherein said means for extracting includes means for identifying an absolute or relative size on the basis of the result of said extraction.

9. A system for automatically understanding according to claim 6, wherein said grammar includes one virtual rectangular region generated from a plurality of spatially separated rectangular regions.

10. A system for automatically understanding according to claim 6, wherein said means for extracting includes means for executing a search until variables representing absolute or relative sizes of said rectangular regions do not exist any longer.

11. A system for understanding according to claim 6, wherein said means for storing stores characteristics for a plurality of said rectangular regions.

12. A system for understanding according to claim 6, wherein said means for matching includes means for recognizing an image pattern inside said rectangular region obtained by said rectangular region extraction means.

* * * * *